UNITED STATES PATENT OFFICE.

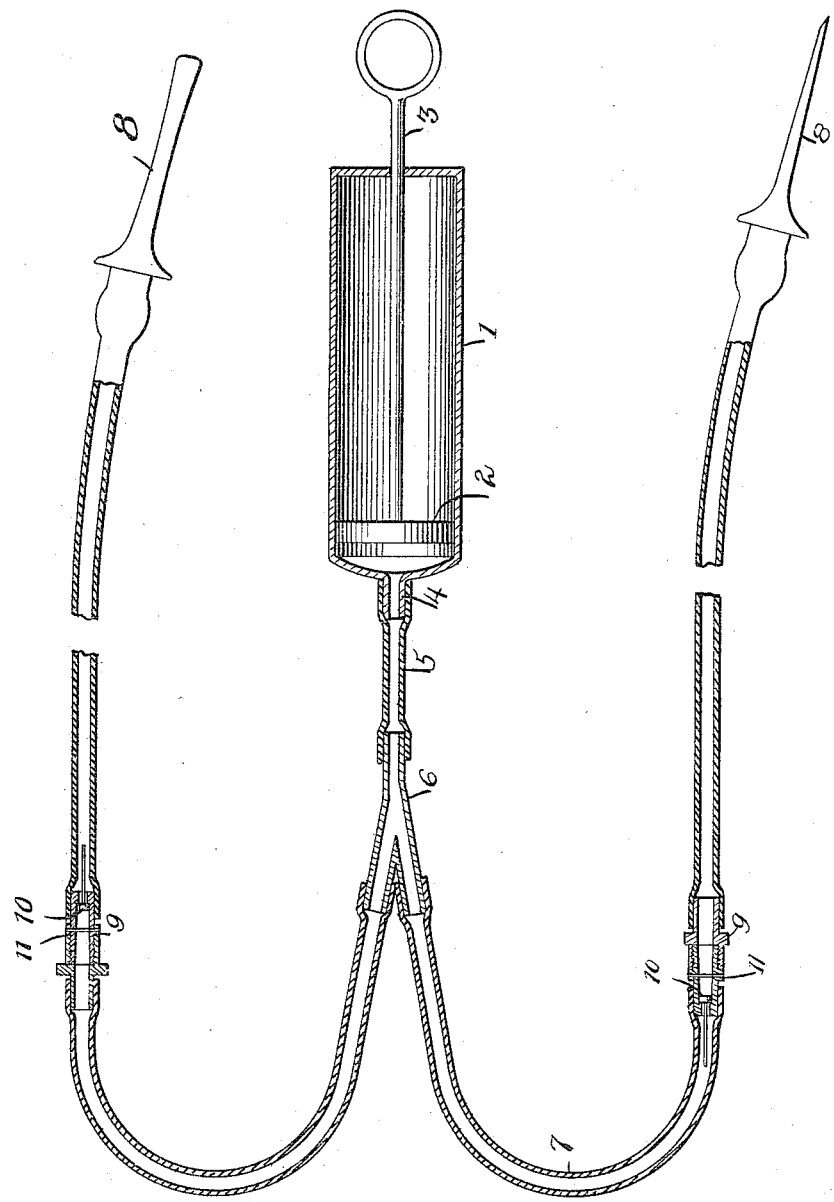

CHEVES BEVILL, OF WALDRON, ARKANSAS, ASSIGNOR OF ONE-HALF TO SIMS DU VAL BEVILL, OF WALDRON, ARKANSAS.

ASPIRATING-SYRINGE.

986,263.  Specification of Letters Patent.  Patented Mar. 7, 1911.

Application filed October 14, 1909. Serial No. 522,514.

*To all whom it may concern:*

Be it known that I, CHEVES BEVILL, a citizen of the United States, residing at Waldron, in the county of Scott and State of Arkansas, have invented new and useful Improvements in Aspirating-Syringes, of which the following is a specification.

This invention provides an appliance which may be used either as an aspirator or syringe for injecting fluids into cavities to be cleansed.

The purpose of the invention is the provision of an appliance which may be used for removing fluid from openings or cavities or for injecting fluid into parts to be purified or medicated.

The invention embodies a device for alternately creating a suction and a pressure to exhaust and inject, a Y-coupling connected with said device and flexible tubes connected with the branches of the coupling and provided at their extremities with nozzles or like ends according to the particular use for which the appliance is intended, said tubes being provided in their length with couplings including valves to properly regulate the flow of the fluid in the proper direction and prevent any back flow thereof.

The invention consists of the novel features, details of construction and combination of parts, which hereinafter will be more particularly set forth, finally pointed out in the claim, and illustrated in the accompanying drawing, which is a sectional view of an appliance of the character set forth for the purposes designed.

The device for alternately creating a suction and a pressure comprises a cylinder 1 and a piston 2 arranged to operate therein, a stem 3 being connected with the piston and operating through an opening in an end of the cylinder and provided with a suitable finger piece. The opposite end of the cylinder is provided with a tubular projection 4 to which a short length of flexible tube 5 is fitted. A Y-coupling 6 is connected to the flexible tube 5 and tubes 7 are attached to the branches of the coupling 6. The tubes 7 are provided at their extremities with nozzles 8, which may consist of needles, cannulas or other like end pieces, according to the particular purpose for which the appliance is intended. Couplings 9 are located in the length of the flexible tubes 7 and consist of complemental parts which are connected by means of a screw thread. One of the coupling members is provided with a valve seat and a valve 10. The valves seat in opposite directions, whereby upon creating a suction in the cylinder 1 one of the valves is seated and the other is open and vice versa. The valves 10 may be of any character. To prevent misplacement of the valves a pin 11 is fitted to each coupling, thereby limiting the unseating of the valve.

When using the appliance one of the needles or end pieces 8 is introduced into the cavity or opening from which fluid of any kind is to be removed and upon moving the piston 2 outward in the cylinder 1 the fluid is withdrawn into the cylinder and upon moving the piston 2 inward the fluid is injected from the cylinder through the opposite nozzle or end piece into a suitable place of discharge. If the device is to be used for cleansing an opening or cavity the other nozzle or end piece is introduced therein so that the fluid forced from the cylinder 1 may be discharged into the opening or cavity to be cleansed and carry off the matter to be removed, as will be readily understood.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

An appliance of the character specified comprising a cylinder having a tubular projection at one end, a piston arranged to operate in the cylinder, a stem connected with the piston and extending through the opposite end of the cylinder, a Y-coupling, a short flexible tube connecting the Y-coupling with the tubular projection of said cylinder, flexible tubes connected with the branches of the Y-coupling and provided at their ends with nozzles, a coupling in the length of each flexible tube comprising complemental members, one of which is provided with a valve seat, a valve arranged to operate in the coupling and to close upon said seat, the valves coöperating with the flexible tubes being arranged to seat in opposite directions, and pins connecting the members of the couplings and limiting the movements of the valves.

In testimony whereof I affix my signature in presence of two witnesses.

CHEVES BEVILL.

Witnesses:
W. A. BATES,
FRANK BATES.

Copies of this patent may be obtained for five cents each, by addressing the "Commissioner of Patents, Washington, D. C."